United States Patent
Park et al.

(10) Patent No.: US 10,818,025 B2
(45) Date of Patent: Oct. 27, 2020

(54) STEREO MATCHING METHOD AND APPARATUS

(71) Applicant: SAMSUNG ELECTRONICS CO., LTD., Suwon-si (KR)

(72) Inventors: Seungin Park, Yongin-si (KR); Minsu Ahn, Yongin-si (KR); Jiyeon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 15/707,048

(22) Filed: Sep. 18, 2017

(65) Prior Publication Data
US 2018/0211400 A1 Jul. 26, 2018

(30) Foreign Application Priority Data

Jan. 26, 2017 (KR) .......... 10-2017-0012360

(51) Int. Cl.
| | | |
|---|---|---|
| *G06T 7/593* | (2017.01) | |
| *G06K 9/00* | (2006.01) | |
| *H04N 13/122* | (2018.01) | |
| *H04N 13/106* | (2018.01) | |
| *H04N 13/00* | (2018.01) | |

(52) U.S. Cl.
CPC .......... *G06T 7/593* (2017.01); *G06K 9/00456* (2013.01); *H04N 13/122* (2018.05); *G06T 2207/10012* (2013.01); *H04N 13/106* (2018.05); *H04N 2013/0081* (2013.01)

(58) Field of Classification Search
None
See application file for complete search history.

(56) References Cited

U.S. PATENT DOCUMENTS 9,218,364 B1 * 12/2015 Garrigues ............... G06F 16/50
2004/0095388 A1 * 5/2004 Rocchetti ................. G06F 8/38
715/763

(Continued)

FOREIGN PATENT DOCUMENTS

| CN | 103514625 A | 1/2014 |
|---|---|---|
| CN | 104574391 A | 4/2015 |

(Continued)

OTHER PUBLICATIONS

Sanja Damjanović, Ferdinand van der Heijden, and Luuk J. Spreeuwers, "Local Stereo Matching Using Adaptive Local Segmentation," ISRN Machine Vision, vol. 2012, Article ID 163285, 11 pages, 2012. https://doi.org/10.5402/2012/163285.*

(Continued)

*Primary Examiner* — Jiangeng Sun
(74) *Attorney, Agent, or Firm* — NSIP Law (57) ABSTRACT

A stereo matching method includes extracting feature points of a first image and feature points of a second image, the first image and the second image together constituting a stereo image, determining reference points by matching the feature points of the second image to the feature points of the first image, classifying the reference points, and performing stereo matching on pixels of which disparities are not determined in the first image and the second image based on disparities of the reference points in the pixels determined based on a result of the classifying.

9 Claims, 8 Drawing Sheets

(56) References Cited

U.S. PATENT DOCUMENTS

| | | | | |
|---|---|---|---|---|
| 2012/0263386 A1* | 10/2012 | Schlosser | ............... | G06T 7/593 |
| | | | | 382/218 |
| 2014/0078264 A1 | 3/2014 | Zhang | | |
| 2014/0241612 A1 | 8/2014 | Rhemann et al. | | |
| 2015/0077520 A1* | 3/2015 | Ohba | ................... | A63F 13/213 |
| | | | | 348/47 |
| 2015/0279045 A1* | 10/2015 | Zhong | ................. | G06K 9/6212 |
| | | | | 382/154 |
| 2016/0379074 A1* | 12/2016 | Nielsen | ............... | G06K 9/3241 |
| | | | | 348/143 |
| 2017/0374339 A1* | 12/2017 | Lim | .................... | H04N 13/106 |

FOREIGN PATENT DOCUMENTS

| | | |
|---|---|---|
| CN | 105043298 A | 11/2015 |
| JP | 2005-31044 A | 2/2005 |
| KR | 10-2013-0122581 A | 11/2013 |

OTHER PUBLICATIONS

Geiger, A. et al., "Efficient Large-Scale Stereo Matching," *Proceedings of Asian Conference on Computer Vision*, Nov. 2010 (pp. 1-14).

* cited by examiner

STEREO MATCHING METHOD AND APPARATUS

CROSS-REFERENCE TO RELATED APPLICATION(S)

This application claims the benefit under 35 USC § 119(a) of Korean Patent Application No. 10-2017-0012360 filed on Jan. 26, 2017, in the Korean Intellectual Property Office, the entire disclosure of which is incorporated herein by reference for all purposes.

BACKGROUND

1. Field

The following description relates to a stereo matching method and apparatus.

2. Description of Related Art

A human can determine distances by comparing two images acquired at different locations. Stereo matching refers to an automated computer-based visual field technique for determining distances much in the way a human can by comparing two images acquired at different locations. Stereo matching utilizes a left image and a right image. The left image and the right image may be aligned to achieve an appropriate stereo effect. Corresponding pairs may be extracted from an aligned stereo image through stereo matching. Disparities of the corresponding pairs may be used to obtain depth information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a stereo matching method includes extracting feature points of a first image and feature points of a second image, the first image and the second image together constituting a stereo image, determining reference points by matching the feature points of the second image to the feature points of the first image, classifying the reference points and performing stereo matching on pixels of which disparities are not determined in the first image and the second image based on disparities of the reference points in the pixels determined based on a result of the classifying.

The determining of the reference points may include matching the feature points of the second image to the feature points of the first image using a window-based correlation, and determining, as the reference points, feature points having an optimal cost among the matched feature points using a cost analysis for measuring the window-based correlation.

The classifying of the reference points may include classifying the reference points into a class based on at least one of whether the reference points are present in a region in which a depth discontinuity occurs, whether the reference points are present in a region in which an occlusion occurs, whether the reference points are present in a region having a texture value less than or equal to a preset reference, and whether the reference points have disparity values greater than or equal to a preset reliability.

The classifying of the reference points may include classifying the reference points into a class based on at least one of whether a consistency is maintained by the matching, a ratio between a first optimal cost and a second optimal cost among correlation costs of the reference points calculated based on a cost analysis for measuring a window-based correlation, and whether optimal costs are detected among the correlation costs of the reference points.

The classifying of the reference points further may include classifying a reference point for which the consistency is not maintained by the matching among the reference points into a first class, classifying a reference point for which the consistency is maintained and the ratio between the first optimal cost and the second optimal cost is less than a preset threshold among the reference points into a second class, and classifying a reference point for which the consistency is maintained and the ratio between the first optimal cost and the second optimal cost reaches the preset threshold among the reference points into a third class.

The classifying of the reference points may further include labeling the reference points based on the respective classes of the reference points.

The performing of stereo matching may include performing stereo matching on the pixels by updating disparity values of the reference points based on a reliability of the disparities of the reference points.

The performing of stereo matching on the pixels by updating the disparity values further may include, based on the reliability of the disparities of the reference points, propagating a disparity value of a reference point classified into a third class to a disparity value of a reference point classified into at least one of a first class or a second class, the reference point classified into the third class being adjacent to the reference point classified into at least one of the first class or the second class among the reference points, and performing stereo matching on the pixels based on the propagated disparity value.

The performing of stereo matching on the pixels based on the propagated disparity value may further include determining a polygon that uses the reference points respectively classified into the first class, the second class, and the third class as vertices, determining a search range for calculating disparities of pixels present in the polygon based on the propagated disparity value, and performing stereo matching on the pixels based on the search range.

The performing of stereo matching on the pixels by updating the disparity values of the reference points may include resetting a window that extracts the disparity values of the reference points classified into the first class and the second class from each of the first image and the second image and performing stereo matching on the pixels based on the reset window.

The resetting of the window may include resetting the window based on at least one of a shifted window having an adjustable angle and multiple windows having identical sizes with respect to a reference point of which a depth is discontinued from adjacent reference points among the reference points classified into the first class and the second class, and resetting the window based on an extension window obtained by extending a size of the window with respect to a reference point of which a depth is continued from the adjacent reference points among the reference points classified into the first class and the second class, based on a result of the classifying.

A non-transitory computer-readable storage medium may store instructions that, when executed by a processor, cause the processor to perform the method described above.

A stereo matching apparatus includes a processor and a memory configured to store a computer-readable instruction where, in response to execution of the instruction at the processor, the processor is configured to extract feature points of a first image and feature points of a second image, the first image and the second image together constituting a stereo image, determine reference points by matching the feature points of the second image to the feature points of the first image, classify the reference points, determine disparities of the reference points based on a result of the classifying, and perform stereo matching on pixels of which disparities are not determined in the first image and the second image based on disparities of the reference points determined based on a result of the classifying.

The processor may be further configured to match the feature points of the second image to the feature points of the first image using a window-based correlation, and determine, as the reference points, feature points having an optimal cost among the matched feature points using a cost analysis for measuring the window-based correlation, and the memory is configured to store information including disparity values corresponding to the reference points.

The processor is may be further configured to classify the reference points into a class based on at least one of whether the reference points are present in a region in which a depth discontinuity occurs, whether the reference points are present in a region in which an occlusion occurs, whether the reference points are present in a region having a texture value less than or equal to a preset reference, and whether the reference points have disparity values greater than or equal to a preset reliability.

The processor may be further configured to classify the reference points into a class based on at least one of whether a consistency is maintained by the matching, a ratio between a first optimal cost and a second optimal cost among correlation costs of the reference points calculated based on a cost analysis for measuring a window-based correlation, and whether optimal costs are detected among the correlation costs of the reference points.

The processor may be further configured to classify a reference point for which the consistency is not maintained by the matching among the reference points into a first class, classify a reference point for which the consistency is maintained and the ratio between the first optimal cost and the second optimal cost is less than a preset threshold among the reference points into a second class, and classify a reference point for which the consistency is maintained and the ratio between the first optimal cost and the second optimal cost reaches the preset threshold among the reference points into a third class.

The processor may be further configured to perform stereo matching on the pixels by updating disparity values of the reference points based on a reliability of the disparities of the reference points.

The processor may be further configured to, based on the reliability of the disparities of the reference points, propagate a disparity value of a reference point classified into a third class to a disparity value of a reference point classified into at least one of a first class or a second class, the reference point classified into the third class being adjacent to the reference point classified into at least one of the first class or the second class among the reference points, and perform stereo matching on the pixels based on the propagated disparity value.

The processor may be further configured to determine a polygon that uses the reference points respectively classified into the first class, the second class, and the third class as vertices, determine a search range for calculating disparities of pixels in the polygon based on the propagated disparity value, and perform stereo matching on the pixels based on the search range.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, reference will now be made in detail to examples with reference to the accompanying drawings, wherein like reference numerals refer to like elements throughout.

Figure 1:
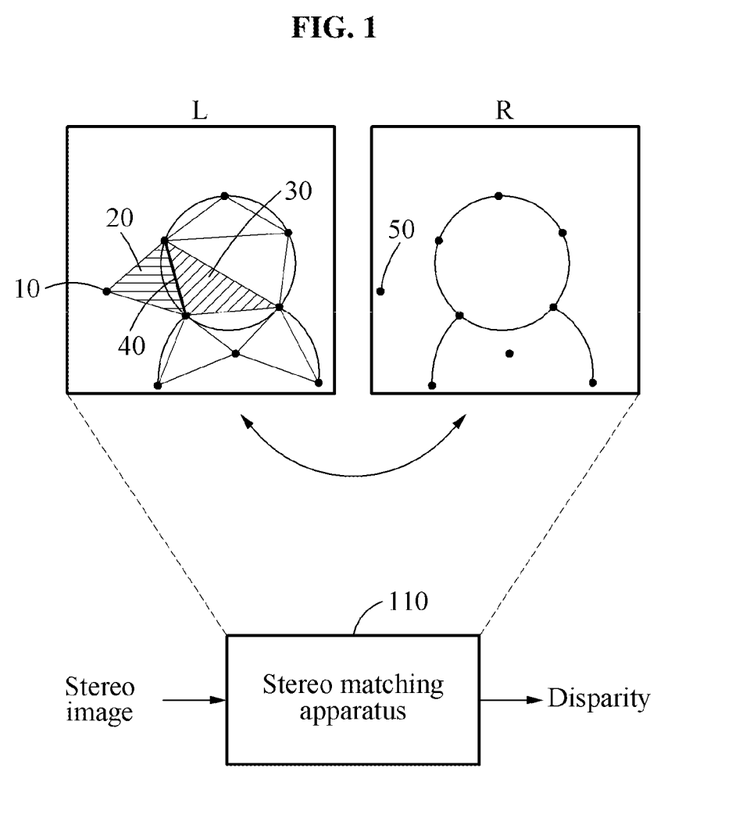
FIG. 1 illustrates an example of a stereo matching process.

FIG. 1 illustrates an example of a stereo matching process. Referring to FIG. 1, a stereo matching apparatus 110 receives a stereo image and outputs disparities of pixels included in the stereo image. The stereo matching apparatus 110 may be configured using at least one software module, at least one hardware module, or various combinations thereof.

The stereo image includes a left image L and a right image R. The stereo matching apparatus 110 detects pixels corresponding to pixels included in the left image L from the right image R, or detects pixels corresponding to pixels included in the right image R from the left image L. Although it is described that corresponding pixels are detected from the right image R based on the left image L below, other configurations are contemplated. For example, corresponding pixels may be also detected from the left image L based on the right image R. In addition, one of the left image L and the right image R may be referred to as a first image, and the other one may be referred to as a second image.

The stereo matching apparatus 110 detects corresponding pixel pairs from the left image L and the right image R, and calculates disparities of the corresponding pixel pairs. Depth information of an object included in the stereo image may be determined based on the disparities. The depth information may be used to render a three-dimensional (3D) image or to measure a distance between a user and the object. For example, an actual object and a virtual object may be mixed in an output image to create an image in augmented reality (AR). Here, a virtual object may be smoothly disposed between actual objects based on depth information of the actual objects.

The depth information may be variously used by a small device, for example, a mobile device and the like. In the case of the small device, battery capacity or computing resources are limited. Accordingly, an accuracy of stereo matching may be maintained and the amount of time and resources used for stereo matching may be reduced and minimized.

In detail, the stereo matching apparatus 110 may sample reference pixels along contour lines included in a first image, and perform edge detection by recognizing pixels and edges adjacent to a boundary showing a sudden depth variation in the contour lines. For example, as shown in FIG. 1, the edges are provided in a shape of a straight line, a polygon, a curved line, a circle, or a point.

The stereo matching apparatus 110 may sample the reference pixels from feature points included in various features such as edges, corners, and points, for example, a meeting point of different objects and/or a pattern created by texture. The stereo matching apparatus 110 may use the sampled reference pixels to generate a polygonal mesh. Under a smoothness constraint that groups similar depth values in one object, pixels having similar depths may be included in a predetermined polygon. Thus, a depth variation may be estimated based on the polygonal mesh, and the stereo matching apparatus 110 may effectively perform stereo matching on the pixels using the polygonal mesh.

FIG. 1 illustrates reference pixels including a reference pixel 10 in the left image L.

The stereo matching apparatus 110 detects corresponding pixels of reference pixels from a second image through stereo matching, and calculates disparities of the reference pixels based on locations of the reference pixels and locations of the corresponding pixels. For example, the stereo matching apparatus 110 may scan a region corresponding to the maximum search range from the right image R using a window of a predetermined size. When the left image L and the right image R are horizontally aligned, a y coordinate of the scanned region may be determined from the right image R based on a y coordinate of the reference pixel 10 of the left image L. In response to detecting a corresponding pixel 50 from the right image R, the stereo matching apparatus 110 may calculate a disparity of the reference pixel 10 based on a difference between an x coordinate of the reference pixel 10 and an x coordinate of the corresponding pixel 50.

The stereo matching apparatus 110 determines a polygon that uses the reference pixels as vertices in the first image, and estimates (or determines) the search range including disparities of pixels present within the polygon based on the disparities of the reference pixels. The left image L includes triangles that use reference pixels as vertices. The triangles may form a triangular mesh. Although the left image L shows the triangular mesh only on a partial region, the triangular mesh may be formed over the entire region of an image. Examples using the triangular mesh are described herein. Also, a rectangular mesh or a pentagonal mesh may be formed using the reference pixels. Alternatively, a mesh in various types of polygons, for example, a triangle, a rectangle, a pentagon, and the like, may be formed using the reference pixels.

An edge included in an image may represent a boundary between an object and a background and/or a boundary between objects. Thus, depth information may significantly vary along the edge used as the boundary. Depth information may vary at a predictable level in a portion excluding the edge. For example, a discontinuity may be present between a disparity of a pixel present within a triangle 20 and a disparity of a pixel present within a triangle 30.

The stereo matching apparatus 110 classifies reference pixels which are present at a boundary and are not matched to each other in the left image L and the right image R, and performs stereo matching on pixels of each image based on the disparities of the reference pixels determined based on a result of classifying.

The stereo matching apparatus 110 classifies the reference pixels based on, for example, a visual cue of an image and a feature of an estimated disparity value.

The stereo matching apparatus 110 classifies the reference points based on at least one of whether the reference points are present in a region in which a depth discontinuity occurs, a region in which an occlusion occurs, a region having a texture value less than or equal to a preset reference, and/or whether the reference points have a disparity value greater than or equal to a preset reliability.

The stereo matching apparatus 110 may enhance an accuracy of stereo matching by varying a method of determining (estimating) a disparity and a range for searching for a disparity of a related pixel based on a class of each reference point. Detailed description of a reference point used for stereo matching is provided with reference to FIG. 2.

The stereo matching apparatus 110 estimates a search range based on a reference value that varies depending on pixel groups. For example, a search range for performing stereo matching on a pixel present within the triangle 30 is calculated based on disparities of three reference pixels that constitute the triangle 30. A search range for performing stereo matching on a pixel present within the triangle 20 may be calculated based on disparities of three reference pixels that constitute the triangle 20.

Here, disparities of reference pixels present on a line segment 40 may correspond to an object, instead of corresponding to a background. In this case, a search range estimated for performing stereo matching on the pixel present within the triangle 30 may not include an actual disparity of the corresponding pixel present within the triangle 20. The stereo matching apparatus 110 may adjust the disparities of the reference pixels present on the line segment 40 such that the search range for performing stereo matching on the pixel present within the triangle 20 includes the actual disparity of the corresponding pixel.

Figure 2A:
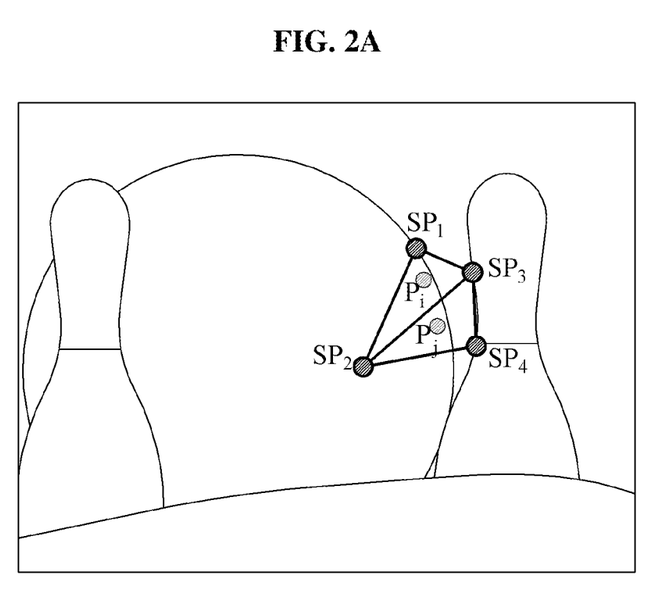
FIGS. 2A and 2B illustrate examples of reference points used for stereo matching.
Figure 2B:
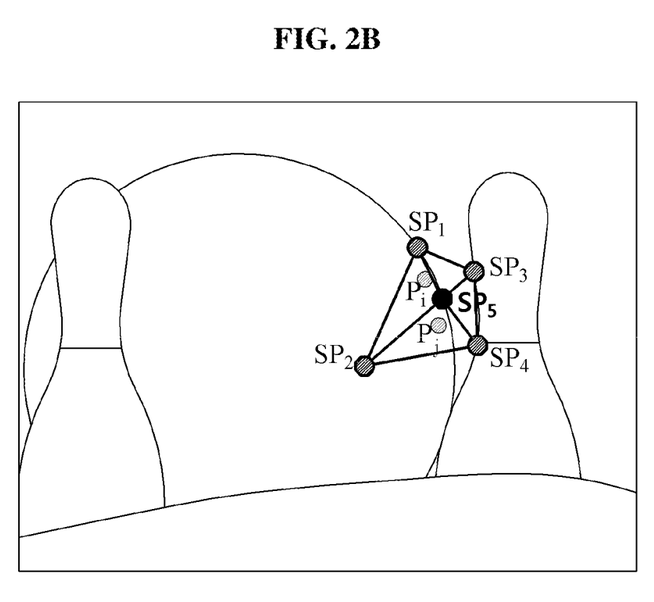

FIGS. 2A and 2B illustrate examples of reference points used for stereo matching. Referring to FIGS. 2A and 2B, SP1, SP2, SP3, and SP4 correspond to reference points that are robustly matched in a right eye image and a left eye image, and SP5 corresponds to an occluded reference point present at a boundary in any one of the right eye image and the left eye image. The reference points may be determined by matching feature points of the right eye image and feature points of the left eye image.

FIG. 2A illustrates an example in which stereo matching is performed using reference points that are robustly matched in a right eye image and a left eye image.

An edge or a boundary portion of an object is accurately detected from each image. However, when the edge or the boundary portion is occluded by any one of the right eye image and the left eye image, the stereo matching may be unavailable. Thus, a pixel corresponding to the edge or the boundary portion may be excluded from the reference points used for stereo matching as illustrated in FIG. 2A. In this case, a disparity may be inaccurately determined because stereo matching is performed only using a mesh and the matched pixels of the right eye image and the left eye image irrespective of boundary information of an object.

In FIG. 2A, a disparity of a pixel $P_i$ may be found in a search range determined based on a triangle including reference points SP1, SP2, and SP3 as vertices. The search range of the disparity of the pixel $P_i$ may be set based on a value of disparity interpolation between reference points SP1 and SP3. Here, because reference point SP3 is present in another object, for example, a bowling pin, which is different from an object, for example, a bowling ball, in which the pixel $P_i$ is present, invalid information on the disparity of the pixel $P_i$ may be provided. Thus, an error in a calculation result of a disparity may increase.

A disparity of a pixel $P_j$ may be found in a search range determined based on a triangle including reference points SP2, SP3, and SP4 as vertices. Here, the search range of the disparity of the pixel $P_j$ may be set based on a value of disparity interpolation between reference points SP2 and SP3. Because reference point SP3 is present in the object which is different from the object, for example, a bowling ball, in which the pixel $P_i$ is present, invalid information on the disparity of the pixel $P_j$ may be provided. Thus, an error in a calculation result of a disparity may increase.

FIG. 2B illustrates an example in which stereo matching is performed based on reference points present at a boundary. Here, the reference points are not matched in a right eye image and a left eye image.

When SP5 present at the boundary is given as a reference point, the disparity of the pixel $P_i$ may be found in a search range determined based on a triangle including reference points SP1, SP2, and SP5 as vertices. The search range of the disparity of the pixel $P_i$ may be set based on a value of the disparity interpolation between reference points SP1 and SP5. Because reference point SP5 is present in the object, for example, a bowling ball, in which the pixel $P_i$ is present, valid information on the disparity of the pixel Pi may be provided. Thus, an accurate calculation result may be obtained.

In addition, even when the triangle including the pixel $P_j$ does not perfectly fit into the boundary of the object, SP5 may correct and reduce an error caused by using reference point SP3 that is present in a different object.

Because a light intensity is drastically changed in a portion, for example, at a boundary of an object, in which a depth continuity occurs, a plurality of reference points may be detected. However, reference points present at the boundary may be occluded so that the reference points may be present only in one of the right image and the left image. The occluded reference points may be excluded from a set of reference points through a consistency check that checks whether the reference points are consistently shown (represented) in the right eye image and the left eye image for robust matching.

However, the reference points at the boundary (or edge) in each image may well represent the corresponding image such that the reference points should be reflected to constitute each triangle when a mesh is generated through triangulation. Thus, a disparity may be accurately calculated by considering a discontinuity in a following pixel matching process.

Accordingly, in an example, all reference points may be classified into classes and may be included in sets of reference points in lieu of excluding the occluded reference points that are present at the boundary (or edge). Thus, more accurate disparity information and a more accurate result of stereo matching may be obtained.

However, in a case of reference points that are not able to be matched in the right eye image and the left eye image, disparity estimation through matching may be unavailable. In an example, based on a smoothness constraint condition in which a disparity value is minimal in an identical object, the stereo matching is performed by setting disparity values of unmatched reference points as adjacent reliable reference points, that is, disparity values of reference points matched in the right eye image and the left eye image.

In an example, even when ambiguous reference points are detected from a low texture region, the disparity values of the adjacent reliable reference points may be used for pixel matching by setting the disparity values of the adjacent reliable reference points as disparity values of the ambiguous reference points.

Figure 3:
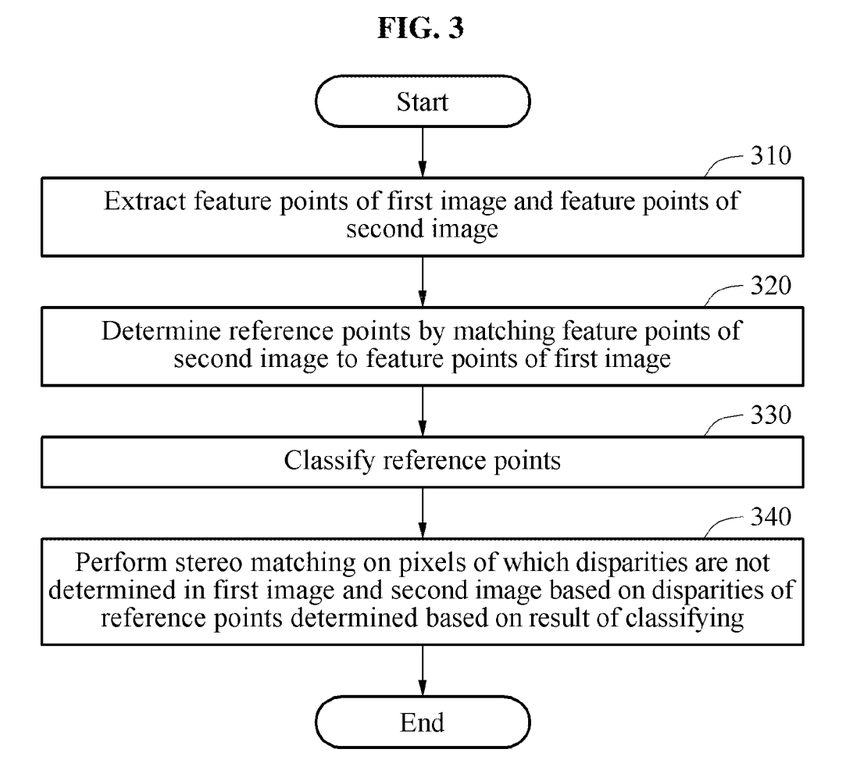
FIG. 3 is a flowchart illustrating an example of a stereo matching method.

FIG. 3 is a flowchart illustrating an example of a stereo matching method. Referring to FIG. 3, in operation 310, a stereo matching apparatus extracts feature points of a first image and feature points of a second image. The first image and second image together constitute a stereo image. The first image may be any one of a left image and a right image.

To extract the feature points of the first image and the feature points of the second image, the stereo matching apparatus may use, for example, a Canny operator for edge detection, a Sobel operator, a Laplacian of Gaussian (LoG) operator, a difference of Gaussian (DoG) operator, a Harris operator for corner detection, a Census transform operator for representing a regional space, a Prewitt operator, a Roberts operator, a Laplacian operator, and/or a Compass operator.

In response to the rectified first image and the rectified second image being input, the stereo matching apparatus may extract the feature points based on various pieces of information including, for example, a light intensity and/or a relative order of the light intensity, obtainable from each image.

In operation 320, the stereo matching apparatus determines the reference points by matching the feature points of the second image to the feature points of the first image. Here, "matching" is also referred to as a correspondence between the feature points of the first image and the feature points of the second image.

The stereo matching apparatus may determine a reference point set using the reference points. The stereo matching apparatus may check whether a right eye image and a left eye image are matched in an appropriately-defined full disparity range set for application with respect to the reference point set. For example, when a general baseline within a threshold length is defined, the full disparity range may be set to be a half size of a scan line of an image. Disparity values of the reference points may be calculated in response to matching the reference points in operation 320. A detailed description of a method by which the stereo matching apparatus determines the reference points is provided with reference to FIG. 4.

In operation 330, the stereo matching apparatus classifies the reference points determined in operation 320. In response to matching the reference points in operation 320, the stereo matching apparatus classifies the reference points into classes based on at least one of whether the reference points are present in a region in which a depth discontinuity occurs, a region in which an occlusion occurs, and a region having a texture value less than or equal to a preset reference, and/or whether the reference points have the disparity values greater than or equal to a preset reliability.

The stereo matching apparatus classifies the reference points into classes based on at least one of whether a consistency is maintained by the matching, a ratio between a first optimal cost and a second optimal cost among correlation costs of the reference points calculated based on a cost analysis for measuring a window-based correlation, and whether a plurality of optimal costs are detected. Here, the "optimal cost" may be understood as referring to a minimum cost. The stereo matching apparatus may label the reference points based on the class of each classified reference point. Detailed description of a method by which the stereo matching apparatus classifies the reference points into classes is provided with reference to FIG. 5.

In operation 340, the stereo matching apparatus performs stereo matching on pixels of which disparities are not determined in the first image and the second image based on disparities of the reference points based on a result of the classifying in operation 330. That is, the stereo matching apparatus may perform stereo matching on pixels of which disparity values are not calculated (or determined) in an image based on the disparities of the reference points determined based on the result of the classifying in operation 330.

In operation 340, the stereo matching apparatus generates a two-dimensional (2D) mesh corresponding to the first image. Alternatively, the stereo matching apparatus may generate a 2D mesh corresponding to the first image and a 2D mesh corresponding to the second image to cross-check whether a consistency of the reference points is maintained by the matching. The stereo matching apparatus may perform stereo matching on the pixels of which disparities are not determined in an image by updating the disparity values of the reference points from the 2D mesh based on a reliability of the disparities of the reference points determined based on the result of the classifying in operation 330. A detailed description of a method by which the stereo matching apparatus performs stereo matching on the pixels of which disparities are not determined in the image is provided with reference to FIG. 6.

In an example, the stereo matching apparatus resets a window that extracts the disparity values of the reference points from the first image and the second image based on the result of classifying, and performs stereo matching on the pixels based on the reset window.

Figure 4:
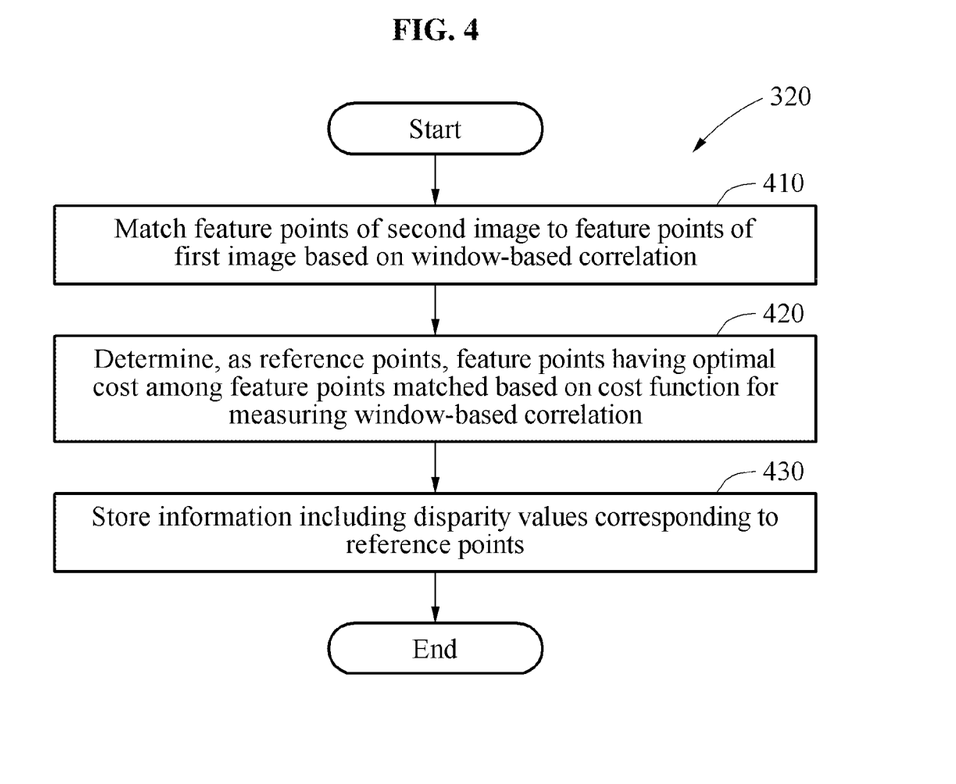
FIG. 4 is a flowchart illustrating an example of a method of determining reference points.

FIG. 4 is a flowchart illustrating an example of a method of determining reference points. Referring to FIG. 4, in operation 410, the stereo matching apparatus matches the feature points of the second image to the feature points of the first image based on a window-based correlation. The stereo matching apparatus may perform a correspondence check between the feature points of the first image and the feature points of the second image based on the window-based correlation that is generally used for local stereo matching.

In operation 420, the stereo matching apparatus determines, as reference points, feature points having an optimal cost among the feature points matched in operation 410 based on a cost analysis for measuring the window-based correlation. Here, the optimal cost may be determined by a minimum value or a maximum value based on a definition of the cost analysis. For example, a sum of absolute differences (SAD), a sum of squared differences (SSD), and a normalized cross correlation (NCC) are used as a cost analysis for measuring a correlation.

In operation 430, the stereo matching apparatus stores information including the disparity values corresponding to the reference points. The stereo matching apparatus may store additional information including, for example, a ratio between a first optimal cost and a second optimal cost, and whether a plurality of optimal cost values are present in order to use the additional information for classifying the reference points.

Figure 5:
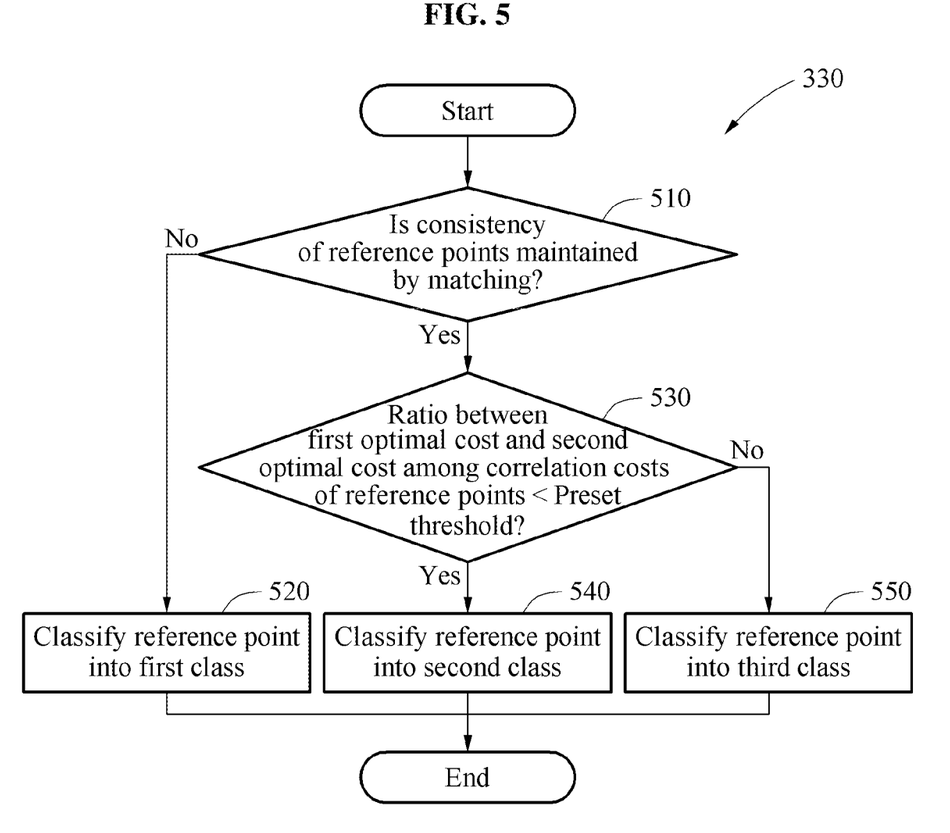
FIG. 5 is a flowchart illustrating an example of a method of classifying reference points.

FIG. 5 is a flowchart illustrating an example of a method of classifying reference points. Referring to FIG. 5, in operation 510, the stereo matching apparatus verifies whether reference point consistency is maintained by matching. In operation 520, the stereo matching apparatus classifies a reference point for which the consistency is not maintained by the matching among the reference points into a first class. Here, the reference point for which the consistency is not maintained by the matching may correspond to an occluded reference point in any one of a right eye image and a left eye image.

In operation 530, the stereo matching apparatus verifies whether a ratio between a first optimal cost and a second optimal cost among correlation costs with respect to the reference point for which the consistency is maintained is less than a preset threshold. Here, the ratio between the first optimal cost and the second optimal cost among the correlation costs being less than the preset threshold may indicate that a difference between the first optimal cost and the second optimal cost is unclear. The reference point for which the difference between the first optimal cost and the second optimal cost is unclear may correspond to an ambiguous reference point having an insufficient texture value.

In operation 540, the stereo matching apparatus classifies a reference point for which the ratio between the first optimal cost and the second optimal cost is less than the preset threshold into a second class.

In operation 550, the stereo matching apparatus classifies a reference point for which the consistency is maintained and the ratio between the first optimal cost and the second optimal cost reaches the preset threshold into a third class. Here, the reference point classified into the third class may correspond to a stable reference point having a reliable disparity value.

Figure 6:
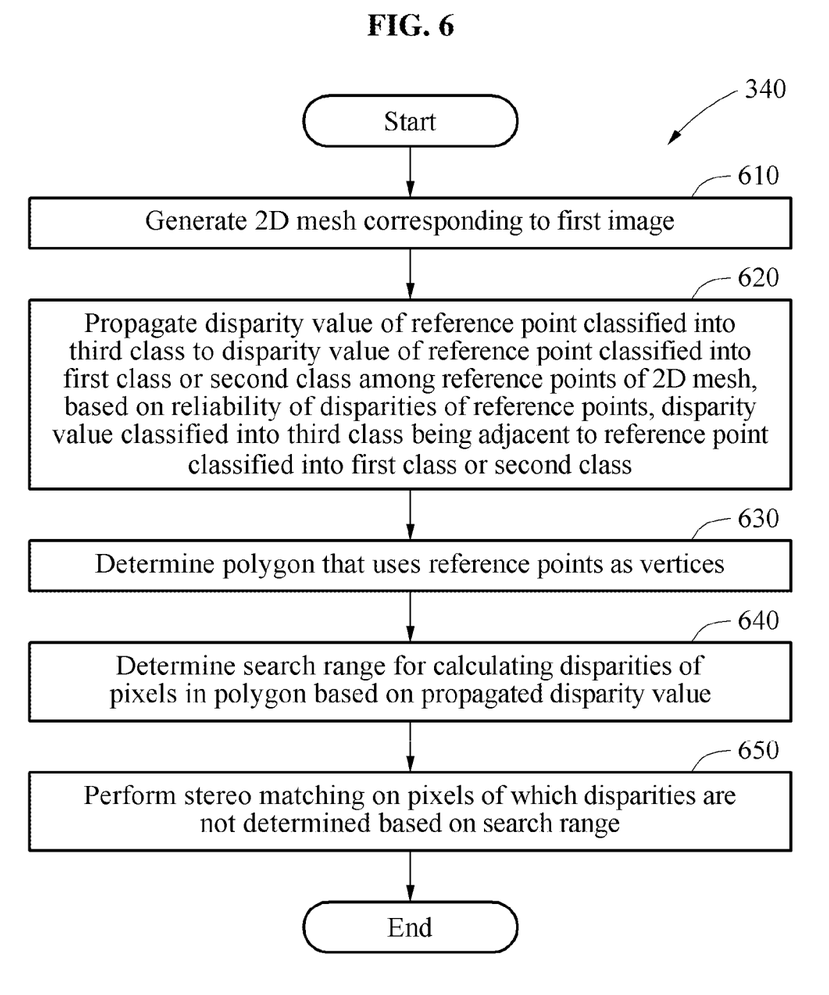
FIG. 6 is a flowchart illustrating an example of a method of performing stereo matching on pixels of which disparities are not determined in an image.

FIG. 6 is a flowchart illustrating an example of a method of performing stereo matching on pixels of which disparities are not determined in an image. Referring to FIG. 6, in operation 610, the stereo matching apparatus generates a two-dimensional (2D) mesh corresponding to a first image. The stereo matching apparatus may generate the 2D mesh on a provided image using reference points. For example, the stereo matching apparatus may generate the 2D mesh based on Delaunay triangulation that constitutes a triangular network by connecting a set of points in triangles.

In operation 620, the stereo matching apparatus propagates a disparity value of a reference point classified into a third class to a disparity value of a reference point classified into at least one of a first class or a second class among reference points of the 2D mesh generated in operation 610 based on a reliability of disparities of the reference points. Here, the reference point classified into the third class is adjacent to the reference point classified into the first class or the second class.

For example, in a case of the reference point classified into the first class or the second class, a disparity value obtained through stereo matching may be unreliable. Thus, after triangulation is performed, the stereo matching apparatus may propagate an adjacent reference point having a reliable disparity value in a triangle including the reference point classified into the first class or the second class, that is, the disparity value of the reference point classified into the third class, such that the reference points may be used as the disparity value of the reference point classified into the first class or the second class.

In operation 630, the stereo matching apparatus determines a polygon, for example, a triangle, that uses the reference points as vertices. Here, the reference points may be classified into the first class or the second class, in addition to the third class. The reference points classified into the third class may have reliable disparity values by matching a right eye image and a left eye image. Thus, when the polygon is constituted, the reference points classified into the third class may be determined as vertices of the polygon. Also, the reference points classified into the first class or the second class may be determined as the vertices of the polygon. In operation 640, the stereo matching apparatus determines a search range for calculating disparities of pixels in the polygon based on the propagated disparity value. The stereo matching apparatus may determine the disparities by narrowing the search range based on the disparity values of the reference points constituting the triangle when the disparity values of the pixels included in the polygon, for example, triangle, are determined.

In operation 650, the stereo matching apparatus performs stereo matching on the pixels of which disparities are not determined in the image based on the search range determined in operation 640.

Figure 7:
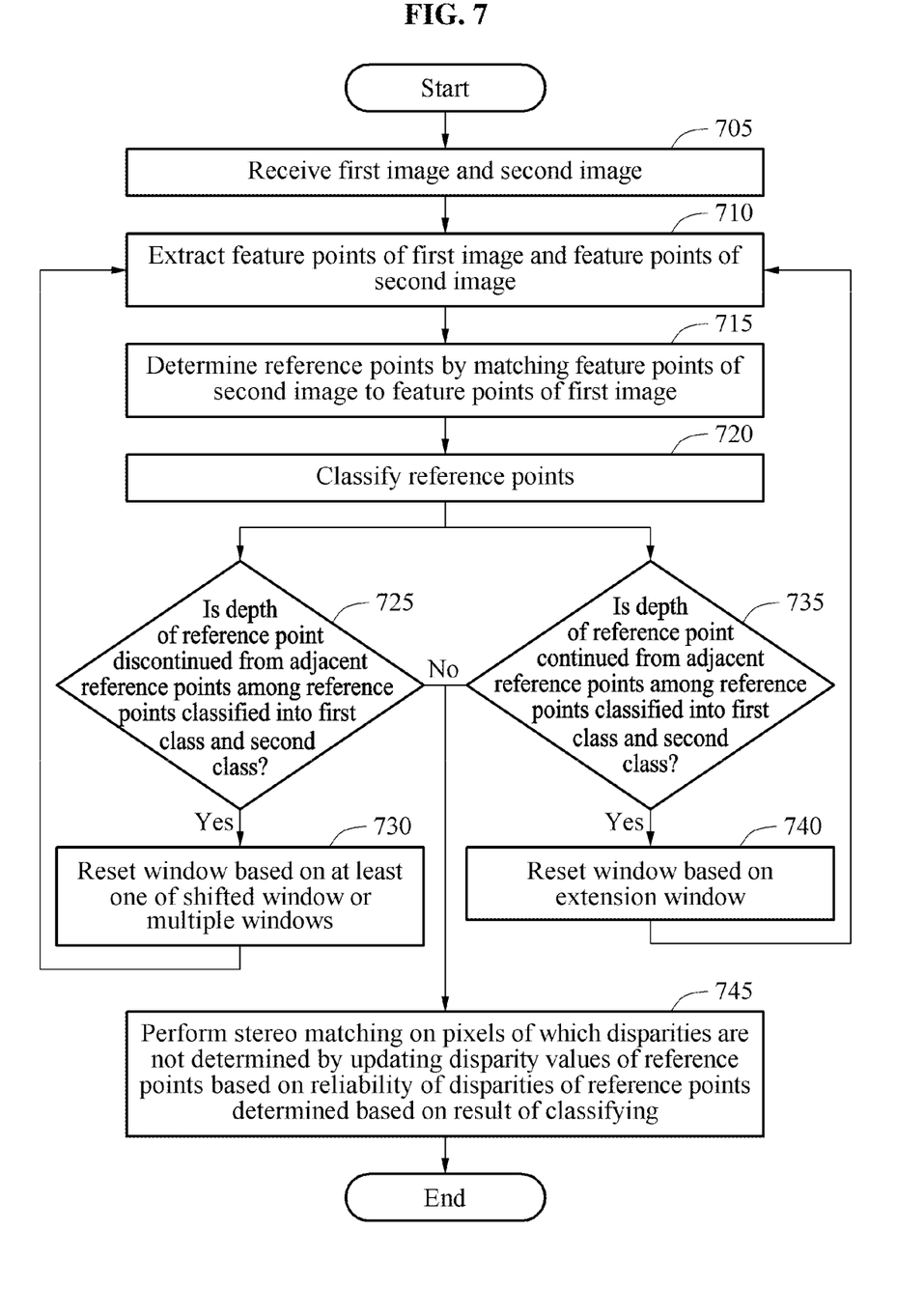
FIG. 7 is a flowchart illustrating another example of a stereo matching method.

FIG. 7 is a flowchart illustrating another example of a stereo matching method. Referring to FIG. 7, in operation 705, the stereo matching apparatus receives a first image and a second image. The first image and the second image may correspond to a right eye image and a left eye image.

In operation 710, the stereo matching apparatus extracts feature points of the first image and feature points of the second image. In operation 715, the stereo matching apparatus determines reference points by matching the feature points of the second image to the feature points of the first image.

In operation 720, the stereo matching apparatus classifies the reference points determined in operation 715.

In operation 725, the stereo matching apparatus verifies whether a depth of a reference point is discontinued from adjacent reference points among the reference points classified into a first class and a second class based on a result of the classifying in operation 720.

Based on a result of the verifying that the depth of the reference point is discontinued from the adjacent reference points in operation 725, the stereo matching apparatus resets a window based on at least one of a shifted window having an adjustable angle or multiple windows having an identical size in operation 730. In operation 710, the stereo matching apparatus extracts the feature points of the first image and the feature points of the second image based on the window reset in operation 730.

Based on the result of the verifying that the depth of the reference point is not discontinued from the adjacent reference points in operation 725, the stereo matching apparatus performs matching on pixels by updating disparity values of the reference points based on a reliability of the disparities of the reference points determined based on a result of the classifying, in operation 745.

In operation 735, the stereo matching apparatus verifies whether the depth of the reference point is continued from the adjacent reference points among the reference points classified into the first class and the second class based on a result of the classifying in operation 720.

Based on a result of the verifying that the depth of the reference point is continued from the adjacent reference points among the reference points classified into the first class and the second class in operation 735, the stereo matching apparatus resets the window based on an extension window obtained by extending a size of the window with respect to the reference point of which the depth is continued from the adjacent reference points in operation 740. In operation 710, the stereo matching apparatus extracts the feature points of the first image and the feature points of the second image based on the window reset in operation 740.

Based on the result of the verifying that the depth of the reference point is not continued from the adjacent reference points among the reference points classified into the first class and the second class in operation 735, the stereo matching apparatus performs stereo matching on pixels of which disparities are not determined in an image by updating the disparity values of the reference points based on the reliability of the disparities of the reference points determined based on the result of the classifying, in operation 745.

Figure 8:
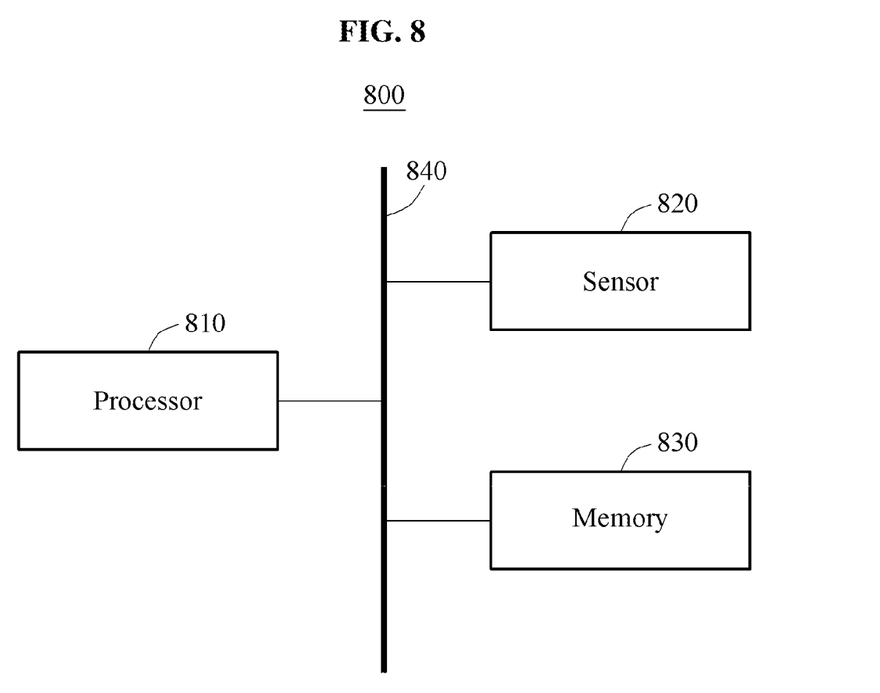
FIG. 8 is a block diagram illustrating an example of a stereo matching apparatus.

FIG. 8 is a block diagram illustrating an example of a stereo matching apparatus. Referring to FIG. 8, a stereo matching apparatus 800 includes a processor 810, a sensor

820, and a memory 830. The processor 810, the sensor 820, and the memory 830 may communicate with each other via a communication bus 840.

The processor 810 may process the above-described operations associated with stereo matching. In more detail, the processor 810 extracts feature points of a first image and feature points of a second image, and determines reference points by matching the feature points of the second image to the feature points of the first image. The processor 810 classifies the reference points and performs stereo matching on pixels of which disparities are not determined in the first image and the second image based on disparities of the reference points determined based on a result of the classifying.

The processor 810 matches the feature points of the second image to the feature points of the first image based on a window-based correlation, and determines, as the reference points, feature points having an optimal cost among the feature points matched based on a cost analysis for measuring the window-based correlation. In addition, the processor 810 may perform at least one of the above-described methods of FIGS. 1 through 7, and a further description is omitted. The processor 810 executes instructions or programs, or controls the stereo matching apparatus 800.

The sensor 820 may capture a stereo image. The sensor 820 may include a first sensor configured to capture a left image and a second sensor configured to capture a right image. Each of the first sensor and the second sensor may be, for example, an image sensor, a proximity sensor, or an infrared ray sensor. The sensor 820 may capture a stereo image, using, for example, a method of converting an optical image into an electrical signal. The sensor 820 may transfer at least one of a captured color image, a captured depth image, and a captured infrared ray image to the at least one of the processor 810 and/or the memory 830.

The memory 830 stores information including disparity values corresponding to the reference points. Also, the memory 830 may store data associated with the aforementioned stereo matching. For example, the memory 830 may store a stereo image, information on the extracted feature points, information on the determined reference points, information on a result of the classifying of the reference points, and a result of stereo matching.

The memory 830 stores computer-readable instructions. In response to execution of instructions stored in the memory 830 at the processor 810, the processor 810 may perform an operation associated with the aforementioned stereo matching.

The stereo matching apparatus 800 may be connected to an external device, for example, a personal computer (PC) and a network (not shown), through an input/output device, and may exchange data. The stereo matching apparatus 800 may be configured as at least a portion of a mobile device, for example, a mobile phone, a smartphone, a personal digital assistant (PDA), a tablet computer, a laptop computer, etc., a computing device, for example, a PC, a tablet computer, a net-book, etc., or an electronic device, for example, a television, a smart television, a security device for controlling a gate, etc. The aforementioned description may be applicable to the stereo matching apparatus 800 and thus, a further description is omitted.

Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A stereo matching method, comprising:
   extracting feature points of a first image and feature points of a second image, the first image and the second image together constituting a stereo image;
   determining reference points by matching the feature points of the second image to the feature points of the first image;
   classifying the reference points comprises any one or any combination of:
      classifying a reference point for which a consistency is not maintained by the matching among the reference points into a first class,
      classifying a reference point for which the consistency is maintained and a ratio between the first optimal cost and the second optimal cost among correlation costs of the reference points calculated based on a cost analysis for measuring a window-based correlation is less than a threshold among the reference points into a second class, and
      classifying a reference point for which the consistency is maintained and the ratio between the first optimal cost and the second optimal cost reaches the threshold among the reference points into a third class;
   resetting a window based on at least one of a shifted window having an adjustable angle and multiple windows having identical sizes with respect to a reference point of which a depth is discontinued from adjacent reference points among reference points classified into the first class and the second class;
   resetting the window based on an extension window obtained by extending a size of the window with respect to a reference point of which a depth is continued from the adjacent reference points among reference points classified into the first class and the second class; and
   performing stereo matching on pixels based on the reset window.

2. The stereo matching method of claim 1, wherein the determining of the reference points comprises:
   matching the feature points of the second image to the feature points of the first image using a window-based correlation; and
   determining, as the reference points, feature points having an optimal cost among the matched feature points using a cost analysis for measuring the window-based correlation.

3. The stereo matching method of claim 1, wherein the classifying of the reference points comprises classifying the reference points into a class based on at least one of:
   whether the reference points are present in a region in which a depth discontinuity occurs,
   whether the reference points are present in a region in which an occlusion occurs,
   whether the reference points are present in a region having a texture value less than or equal to a preset reference, and
   whether the reference points have disparity values greater than or equal to a preset reliability.

4. The stereo matching method of claim 1, wherein the classifying of the reference points further comprises labeling the reference points based on the respective classes of the reference points.

5. A non-transitory computer-readable storage medium storing instructions that, when executed by a processor, cause the processor to perform the method of claim 1.

6. A stereo matching apparatus, comprising:
   a processor; and
   a memory configured to store a computer-readable instruction,
   wherein, in response to execution of the instruction at the processor, the processor is configured to:
      extract feature points of a first image and feature points of a second image, the first image and the second image together constituting a stereo image,
      determine reference points by matching the feature points of the second image to the feature points of the first image,
      classify the reference points comprising any one or any combination of:
         classify a reference point for which the consistency is not maintained by the matching among the reference points into a first class,
         classify a reference point for which the consistency is maintained and the ratio between the first optimal cost and the second optimal cost is less than a preset threshold among the reference points into a second class, and
         classify a reference point for which the consistency is maintained and the ratio between the first optimal cost and the second optimal cost reaches the preset threshold among the reference points into a third class,
      reset a window based on at least one of a shifted window having an adjustable angle and multiple windows having identical sizes with respect to a reference point of which a depth is discontinued from adjacent reference points among reference points classified into the first class and the second class;
      reset the window based on an extension window obtained by extending a size of the window with respect to a reference point of which a depth is continued from the adjacent reference points among the reference points classified into the first class and the second class; and perform stereo matching on pixels based on the reset window.

7. The stereo matching apparatus of claim 6, wherein the processor is further configured to:

match the feature points of the second image to the feature points of the first image using a window-based correlation, and determine, as the reference points, feature points having an optimal cost among the matched feature points using a cost analysis for measuring the window-based correlation, and the memory is configured to store information including disparity values corresponding to the reference points.

8. The stereo matching apparatus of claim 6, wherein the processor is further configured to classify the reference points into a class based on at least one of:

whether the reference points are present in a region in which a depth discontinuity occurs, whether the reference points are present in a region in which an occlusion occurs, whether the reference points are present in a region having a texture value less than or equal to a preset reference, and whether the reference points have disparity values greater than or equal to a preset reliability.

9. The stereo matching apparatus of claim 6, wherein the processor is further configured to:

classify the reference points into a class based on at least one of:

whether a consistency is maintained by the matching, a ratio between a first optimal cost and a second optimal cost among correlation costs of the reference points calculated based on a cost analysis for measuring a window-based correlation, and whether optimal costs are detected among the correlation costs of the reference points.

\* \* \* \* \*